United States Patent
Chen et al.

(10) Patent No.: US 8,155,481 B2
(45) Date of Patent: Apr. 10, 2012

(54) SYSTEMS AND METHODS FOR CREATING PHOTOBOOKS

(75) Inventors: Eugene Chen, Belmont, CA (US); Trynne Anne Miller, San Francisco, CA (US); Su Mien Quek, Oakland, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 13/226,989

(22) Filed: Sep. 7, 2011

(65) Prior Publication Data

US 2011/0320932 A1 Dec. 29, 2011

Related U.S. Application Data

(63) Continuation of application No. 12/235,088, filed on Sep. 22, 2008, now Pat. No. 8,036,489, which is a continuation-in-part of application No. 11/176,049, filed on Jul. 7, 2005, now Pat. No. 7,474,801.

(51) Int. Cl.
   *G06K 9/40* (2006.01)
(52) U.S. Cl. ........ 382/284; 382/282; 382/294; 358/540; 358/450
(58) Field of Classification Search ............... 382/282, 382/284; 358/540, 450
   See application file for complete search history.

(56) References Cited

U.S. PATENT DOCUMENTS

| | | | |
|---|---|---|---|
| 5,974,401 A | 10/1999 | Enomoto | |
| 6,017,157 A | 1/2000 | Garfinkle et al. | |
| 6,064,397 A | 5/2000 | Herregods | |
| 6,154,295 A | 11/2000 | Fredlund | |
| 6,288,719 B1 | 9/2001 | Squilla | |
| 6,349,194 B1 | 2/2002 | Nozaki | |
| 6,362,900 B1 | 3/2002 | Squilla | |
| 6,388,732 B1 | 5/2002 | William | |
| 6,570,640 B1 | 5/2003 | Garfinkle et al. | |
| 6,667,814 B1 | 12/2003 | Tillotson | |
| 6,727,909 B1 | 4/2004 | Matsumura | |
| 7,345,150 B2 * | 3/2008 | Assaly et al. | 530/362 |
| 7,474,801 B2 * | 1/2009 | Teo et al. | 382/284 |
| 7,525,680 B2 * | 4/2009 | Berarducci et al. | 358/1.15 |
| 7,635,734 B2 * | 12/2009 | Alferiev et al. | 525/54.1 |
| 2004/0032599 A1 | 2/2004 | Atkins | |

FOREIGN PATENT DOCUMENTS

EP 0 975 147 A2 10/1999
WO WO 01/82231 11/2001

* cited by examiner

*Primary Examiner* — Yosef Kassa
(74) *Attorney, Agent, or Firm* — Xin Wen

(57) ABSTRACT

A method for producing a photo album includes providing a library of page layouts, selecting a first group of one or more images to be placed in the first page of the photo album, selecting a second group of one or more images to be placed in the second page of the photo album, graphically displaying the first group of one or more images within a first border that represents a first page, graphically displaying the second group of one or more images within a second border that represents a second page, automatically selecting a first page layout from the library of page layouts, and automatically placing the first group of one or more images into the one or more image receiving areas in the first page layout to produce the first page in the photo album.

18 Claims, 19 Drawing Sheets

Select images images 10-18

Previous page 420     410 Next Page

Select the number of images on each page of your photo album

☐ 1 image per page

☐ 2 images per page

☐ 3 images per page

☐ A mixed number of images per page

FIG. 7A

SYSTEMS AND METHODS FOR CREATING PHOTOBOOKS

The present invention is a continuation application of and claims priority to commonly assigned U.S. patent application Ser. No. 12/235,088, titled "Automatic generation of a photo album", filed on Sep. 22, 2008 now U.S. Pat. No. 8,036,489. U.S. patent application Ser. No. 12/235,088 is a Continuation-in-Part Patent Application of and claims priority to commonly assigned U.S. patent application Ser. No. 11/176,049, titled "Automatic generation of a photo album", filed on Jul. 7, 2005 now U.S. Pat. No. 7,474,801. The disclosures of these patent applications are incorporated herein by reference.

TECHNICAL FIELD

This application relates to utilization of digital images, and more specifically, to the design and creation of products based on digital images.

BACKGROUND

In recent years, photography has been rapidly transformed from chemical based technologies to digital imaging technologies. Images captured by digital cameras can be stored in computers and viewed on display devices. Users can also produce image prints based on the digital images. Such image prints can be generated locally using output devices such an inkjet printer or a dye sublimation printer or remotely by a photo printing service provider. Other products that can be produced using the digital images can include photo books, photo calendars, photo mug, photo T-shirt, and so on. A photo book can include a cover page and a plurality of image pages each containing one or more images. Designing a photo album can include many iterative steps such as selecting suitable images, selecting layout, selecting images for each page, add text, and rearrange the images and text, which can be quite time consuming. It is desirable to provide methods to allow users to design and produce photo albums in a time efficient manner.

SUMMARY

In one general aspect, the present invention relates to a method for producing a photo album. The method includes providing a plurality of images comprising a first image; associating text information with the first image; providing a library of page layouts each comprising one or more image receiving areas, wherein at least one of the page layouts includes an image caption area associated with one of the image receiving areas in the page layout; after the step of associating, automatically selecting a first page layout from the library of page layouts, wherein the first page layout comprises an image receiving area and an image caption area in association with the image receiving area; automatically placing the first image in the image receiving area in the first page layout; and automatically placing the text information into the image caption area in association with the image receiving area in the first page layout to produce a page in the photo album.

In another general aspect, the present invention relates to a method for producing a photo album. The method includes providing a plurality of images including a first image; associating text information with the first image; selecting a first group of one or more images to be placed in a page of the photo album from the plurality of images, wherein the first group includes the first image; providing a library of page layouts each comprising one or more image receiving areas, wherein at least one of the page layouts includes an image caption area associated with one of the image receiving areas in the page layout; after the step of associating, automatically selecting a first page layout from the library of page layouts, wherein the first page layout comprises an image receiving area and an image caption area in association with the image receiving area, wherein the step of automatically selecting a first page layout comprises matching the number of image receiving areas in the first page layout with the number of images in the first group; automatically placing the first image in the image receiving area in the first page layout; and automatically placing the text information into the image caption area in association with the image receiving area in the first page layout to produce the page in the photo album.

In another general aspect, the present invention relates to a method for producing a photo album. The method includes providing a plurality of images including a first image; associating text information with the first image; selecting, from the plurality of images, a first group of one or more images to be placed in a page of the photo album, wherein the first group includes the first image, wherein the first group of one or more images each has a format selected from the group consisting of portrait, landscape, round, oval, and diamond; providing a library of page layouts each comprising one or more image receiving areas, wherein at least one of the page layouts includes an image caption area associated with one of the image receiving areas in the page layout; after the step of associating, automatically selecting a first page layout from the library of page layouts, wherein the first page layout comprises an image receiving area and an image caption area in association with the image receiving area, wherein the one or more mage receiving areas in the first page layout are each associated with a format selected from the group consisting of portrait, landscape, round, oval, and diamond, wherein the first page layout is automatically selected in part by matching the number of image receiving areas in the first page layout with the number of images in the first group and by matching formats of the one or more image receiving areas in the first page layout with formats of the one or more images in the first group; automatically placing the first image in the image receiving area in the first page layout, wherein the image receiving area has the same format as the format of the first image; and automatically placing the text information into the image caption area in association with the image receiving area in the first page layout to produce the page in the photo album.

In another general aspect, the present invention relates to a method for producing a photo album. The method includes providing a library of page layouts each comprising one or more image receiving areas each associated with a format selected from the group consisting of portrait, landscape, round, oval, and diamond; selecting, from a plurality of images, a first group of one or more images to be placed in the first page of the photo album, wherein the first group of one or more images comprises a first image, wherein the first group of one or more images each has a format selected from the group consisting of portrait, landscape, round, oval, and diamond; selecting, from the plurality of images, a second group of one or more images to be placed in the second page of the photo album; graphically displaying the first group of one or more images within a first border that represents a first page; graphically displaying the second group of one or more images within a second border that represents a second page; automatically selecting a first page layout from the library of page layouts, wherein the first page layout comprises one or more image receiving areas, wherein the number of image receiving areas in the first page layout is matched to be the same as the number of images in the first group; and automatically placing the first group of one or more images into the one or more image receiving areas in the first page layout to produce the first page in the photo album.

In another general aspect, the present invention relates to a method for producing a photo album. The method includes providing a library of page layouts each comprising one or more image receiving areas each associated with a format selected from the group consisting of portrait, landscape, round, oval, and diamond; selecting, from a plurality of images, a first group of one or more images to be placed in the first page of the photo album, wherein the first group of one or more images comprises a first image, wherein the first group of one or more images each has a format selected from the group consisting of portrait, landscape, round, oval, and diamond; selecting, from the plurality of images, a second group of one or more images to be placed in the second page of the photo album; graphically displaying the first group of one or more images within a first border that represents a first page; graphically displaying the second group of one or more images within a second border that represents a second page; automatically selecting a first page layout from the library of page layouts, wherein the first page layout comprises one or more image receiving areas, wherein the formats of the one or more image receiving areas in the first page layout are matched with the formats of the one or more images in the first group; and automatically placing the first group of one or more images into the one or more image receiving areas in the first page layout to produce the first page in the photo album.

In another general aspect, the present invention relates to a method for producing a photo album. The method includes providing a library of page layouts each comprising one or more image receiving areas each associated with a format selected from the group consisting of portrait, landscape, round, oval, and diamond; selecting, from a plurality of images, a first group of one or more images to be placed in the first page of the photo album, wherein the first group of one or more images comprises a first image, wherein the first group of one or more images each has a format selected from the group consisting of portrait, landscape, round, oval, and diamond; selecting, from the plurality of images, a second group of one or more images to be placed in the second page of the photo album; graphically displaying the first group of one or more images within a first border that represents a first page; graphically displaying the second group of one or more images within a second border that represents a second page; automatically selecting a first page layout from the library of page layouts, wherein the first page layout comprises one or more image receiving areas, wherein the formats of the one or more image receiving areas in the first page layout are matched with the formats of the one or more images in the first group; automatically placing the first group of one or more images into the one or more image receiving areas in the first page layout to produce the first page in the photo album; automatically selecting a second page layout from the library of page layouts, wherein the second page layout comprises one or more image receiving areas, wherein the formats of the one or more image receiving areas in the second page layout are matched with the formats of the one or more images in the second group; and automatically placing the second group of one or more images into the one or more image receiving areas in the second page layout to produce the second page in the photo album.

In another general aspect, the present application relates to a method for producing a photo album having a plurality of pages. The method includes selecting a plurality of images each characterized by an image format selected from the group of a portrait format and a landscape format; providing a library of page layouts each comprising one or more image areas configured to receive the selected images, wherein each of the image areas is characterized by an image area format consistent with image format; automatically selecting one or more page layouts from the library of page layouts in accordance with the selected images and their associated image formats; and disposing the selected images in the image areas on the one or more page layouts to produce one or more pages in the photo album.

In another general aspect, the present application relates to a method for producing a photo album having a plurality of pages. The method includes selecting a plurality of images each characterized by an image format selected from the group of a portrait format and a landscape format; providing a library of page layouts each comprising one or more image areas configured to receive the selected images, wherein each of the image areas is characterized by an image area format consistent with image format; automatically selecting one or more page layouts from the library of page layouts in response to the selected images and their associated image formats; automatically matching the image formats of the selected images with the image area formats of the image areas in the page layouts; and disposing the selected images in the image areas on the one or more page layouts to produce one or more pages in the photo album.

In another general aspect, the present application relates to a method for producing a photo album having a plurality of pages. The method includes selecting a plurality of images each characterized by an image format selected from the group of a portrait format and a landscape format; specifying a sequence for the selected images; providing a library of page layouts each comprising one or more image areas configured to receive the selected images, wherein each of the image areas is characterized by an image area format consistent with image format; automatically selecting one or more page layouts from the library of page layouts in response to the sequence and the image formats of the selected images; and disposing the selected images in the image areas on the one or more page layouts to produce one or more pages in the photo album.

The disclosed methods and systems provide easy ways for a user to create photo books. Page layout selections can be automatically generated to match the properties of the image on a page to save user's time. Text information can be stored in association with the images, and can be automatically arranged with its associated image in the page layout.

Implementations of the system may include one or more of the following. The text information associated with the first image can be provided by a user. The method can further include storing the first image and the text information in an integrated data structure in a computer memory. The method can further include automatically displaying the first page having the first image placed in the image receiving area and the text information placed in the image caption area in the first page layout. The method can further include selecting a first group of one or more images to be placed in the page of the photo album from the plurality of images, wherein the first group includes the first image. The method can further include sequencing the plurality of images to produce an image list, wherein the first group of one or more images is selected from the beginning of the image list. The method can further include removing the first group of one or more images from the image list after the step of automatically placing the first image. The step of automatically selecting a first page layout can include matching the number of image receiving areas in the first page layout with the number of images in the first group. The first group of one or more images can each have a format selected from the group consisting of portrait, landscape, round, oval, and diamond. The one or more mage receiving areas in the first page layout can be each associated with a format selected from the group consisting of portrait, landscape, round, oval, and diamond, wherein the step of automatically selecting a first page layout comprises matching formats of the one or more image receiving areas in the first page layout with formats of the one or more images in the first group. The step of automatically placing the first image can include selecting an image receiving area in the first page layout that has the same format as the format of the first image.

Implementations of the system may include one or more of the following. The method can further include moving an image within the first border into the second border to move the associated image from the first page to the second page. The step of automatically selecting a first page layout can include matching the formats of the one or more image receiving areas in the first page layout with the formats of the one or more images in the first group. The method can further include automatically displaying the page having the first group of images placed in the one or more image receiving areas if the first page layout. The method can further include sequencing the plurality of images to produce an image list, wherein the first group of one or more images is selected from the beginning of the image list. The method can further include removing the first group of one or more images from the image list after the step of automatically placing the first group of one or more images. The first page layout can include an image caption area associated with one of the image receiving areas in the page layout. The method can further include associating text information with the first image; and after the step of automatically selecting a first page layout, automatically placing the text information into the image caption area in association with the image receiving area in the first page layout. The method can further include storing the first image and the text information in an integrated data structure in a computer memory.

DRAWING DESCRIPTIONS

The accompanying drawing, which are incorporated in and form a part of this specification, illustrate embodiments of the invention and, together with the description, serve to explain the principles of the invention:

FIG. 1 is a block diagram of a computer system.

FIGS. 2A and 2B respectively show a perspective view and an inside view of a photo album.

FIGS. 6(a)-6(i) illustrate a library of page layouts having different number of images or different image formats.

FIG. 7A illustrates an exemplified user interface for selecting the number of images on a page of a photo album.

Figure 7B:
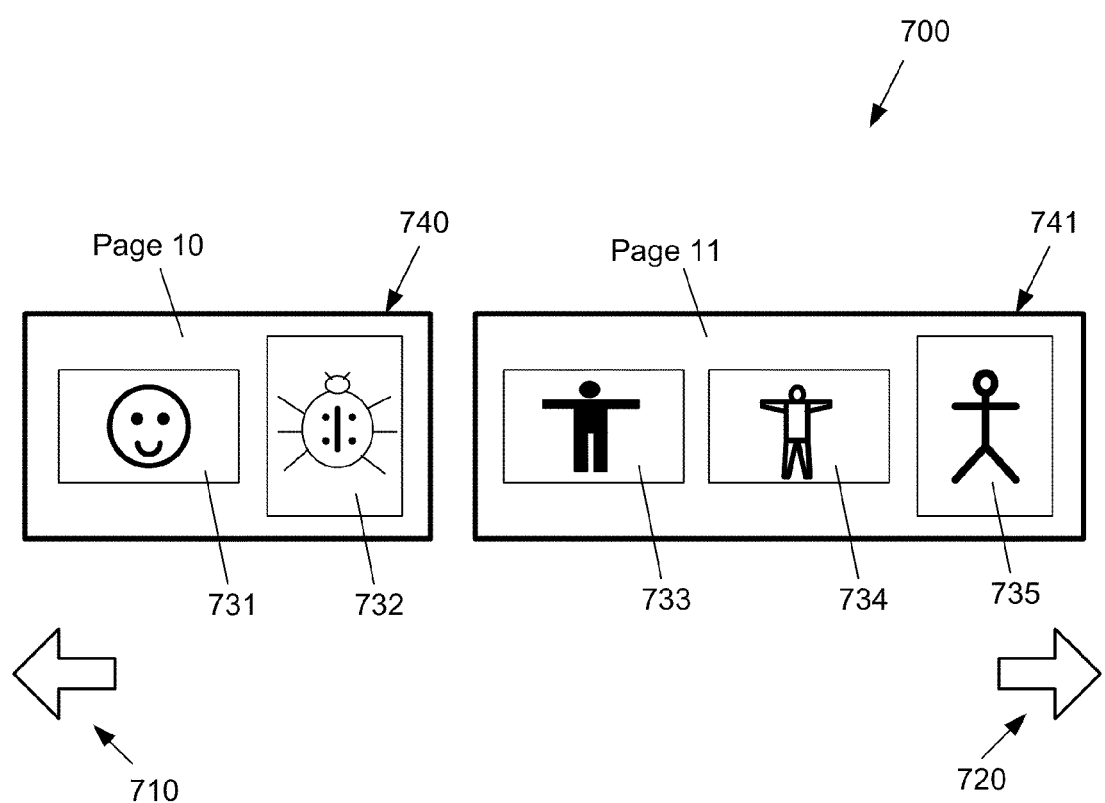

FIG. 7B illustrates another exemplified user interface for selecting the number of images on a page of a photo album.

Figure 8:
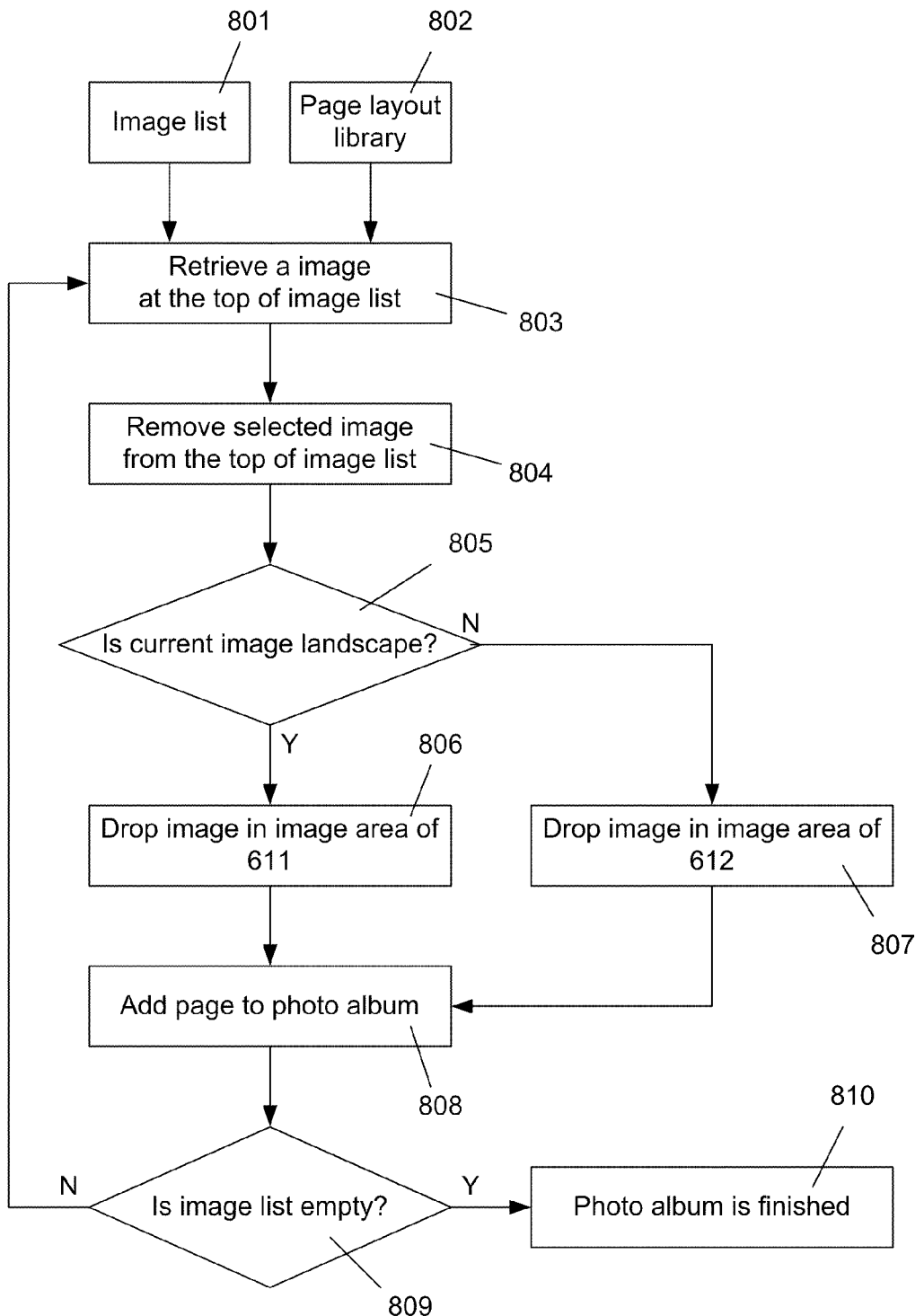

FIG. 8 is an exemplified flow chart for automatic generating a photo album.

Figure 9:
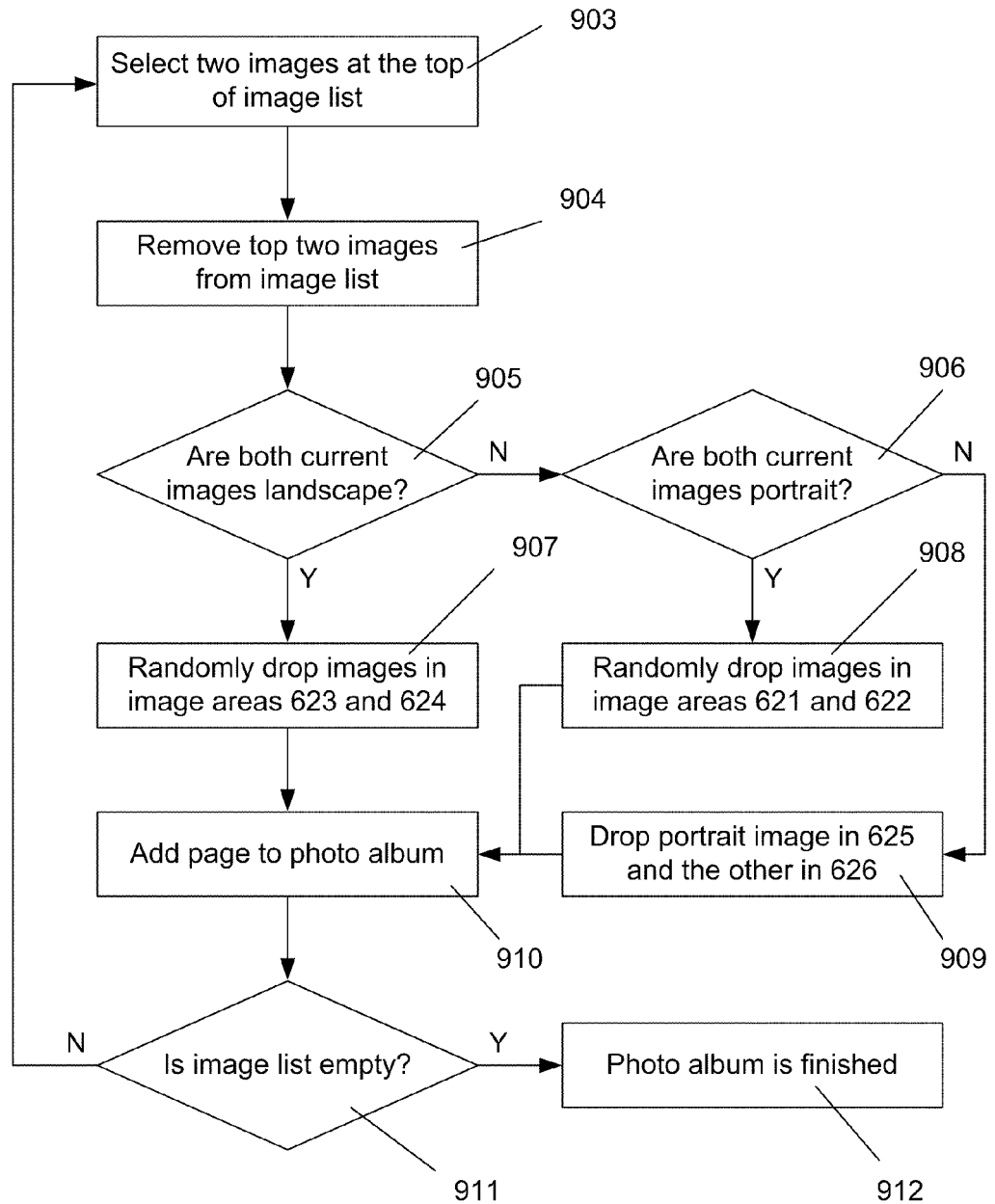

FIG. 9 is another exemplified flow chart for automatic generating a photo album.

Figure 10:
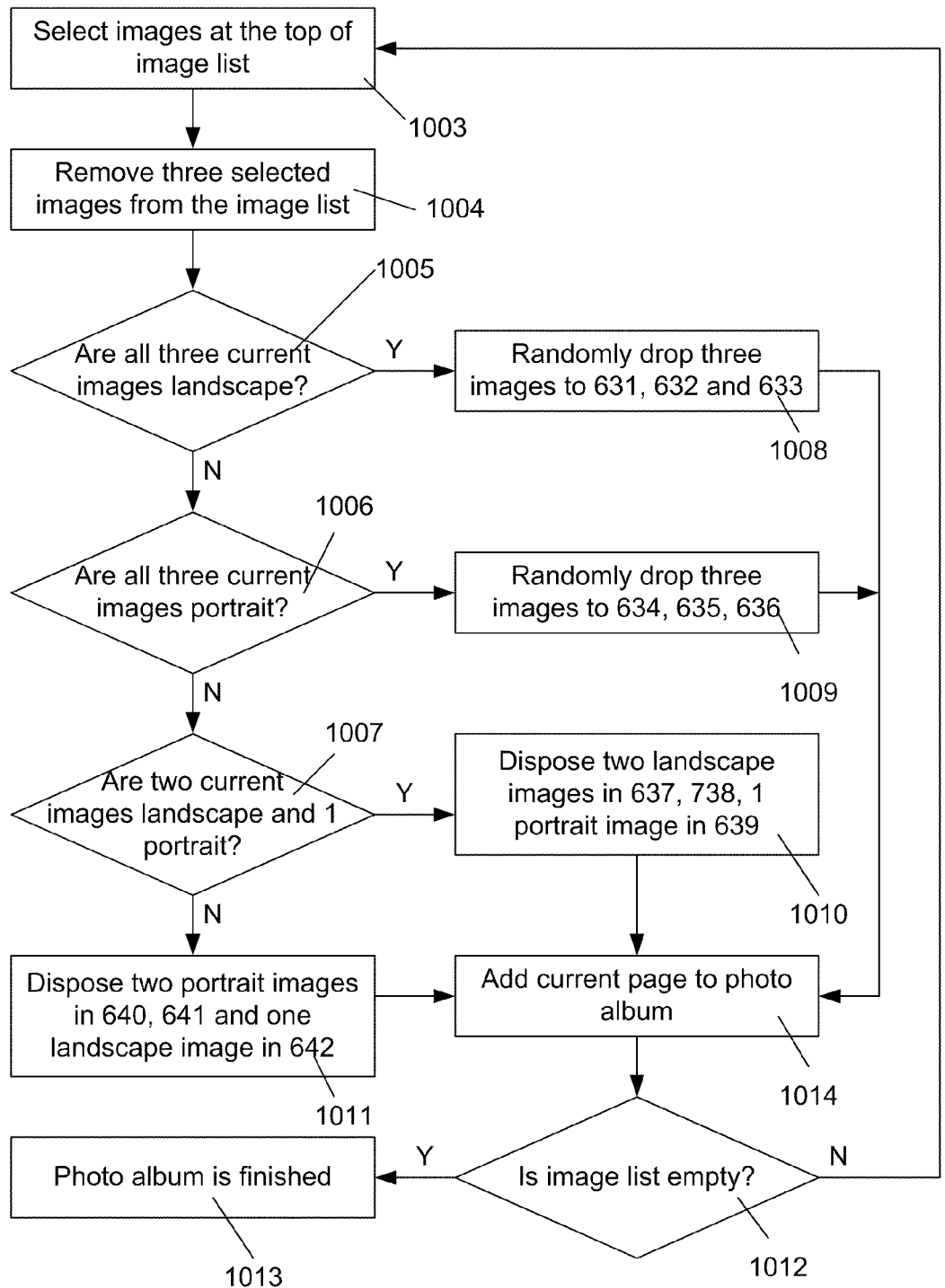

FIG. 10 is another exemplified flow chart for automatic generating a photo album.

Figure 11:
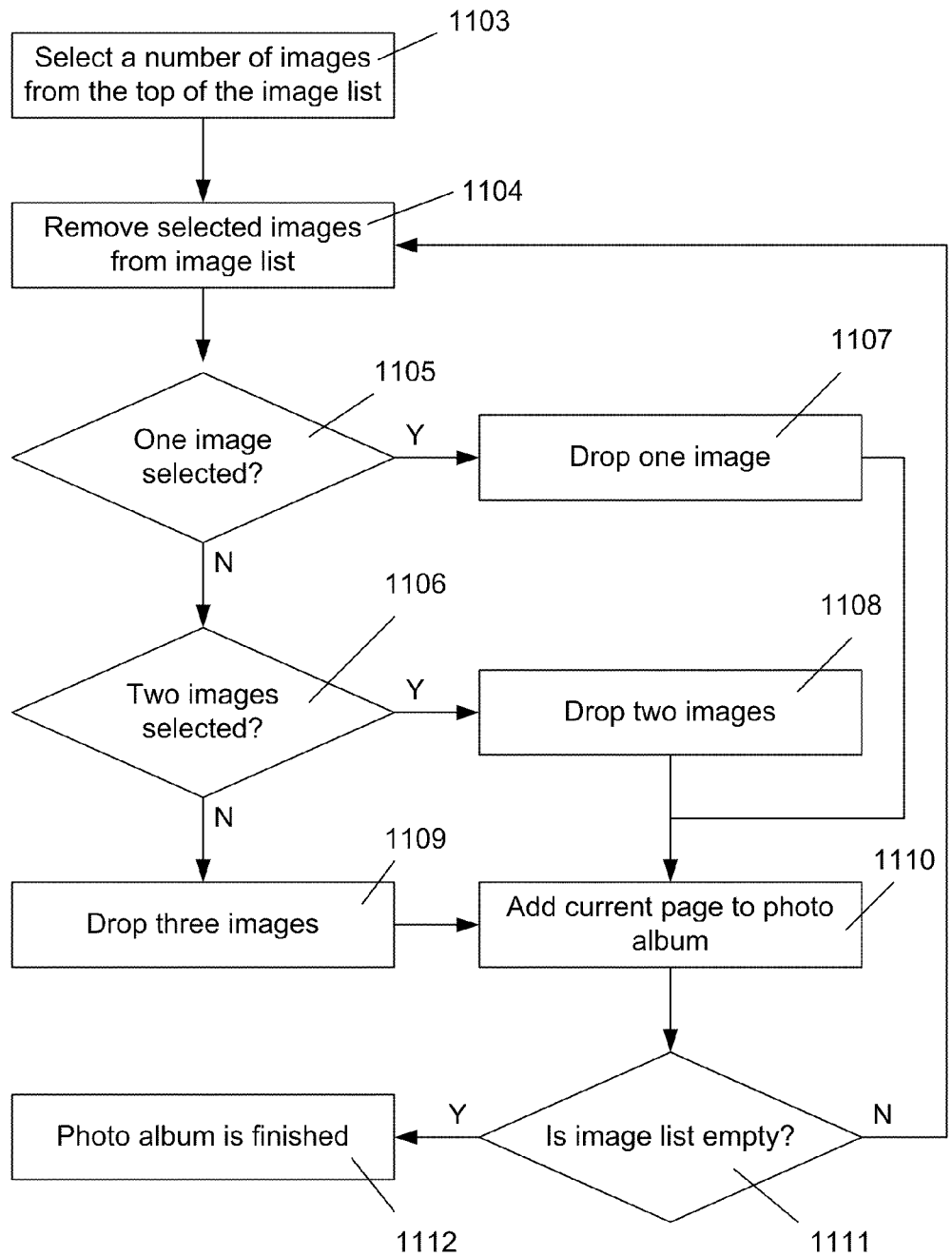

FIG. 11 is another exemplified flow chart for automatic generating a photo album.

Figure 12A:
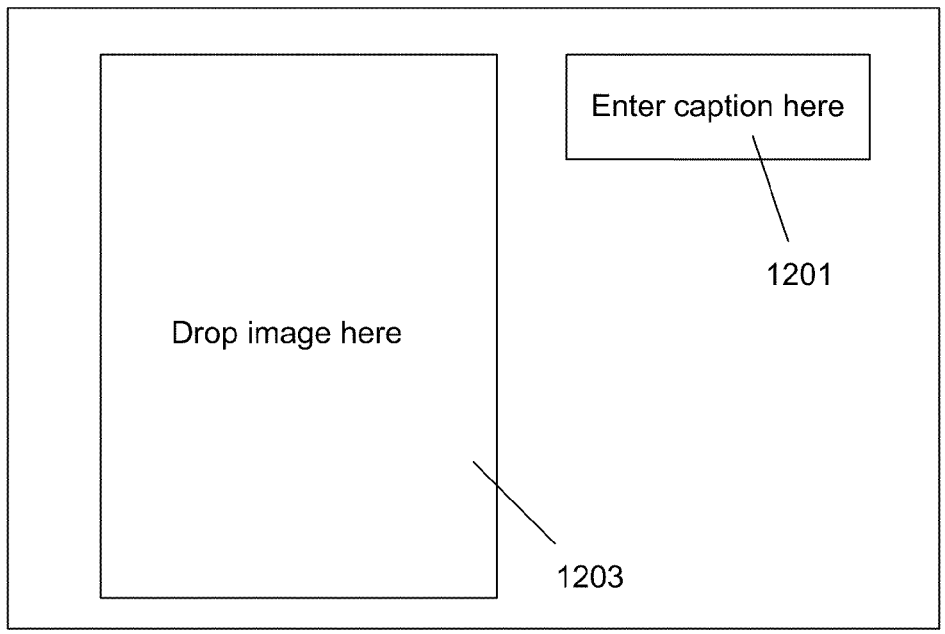
Figure 12B:
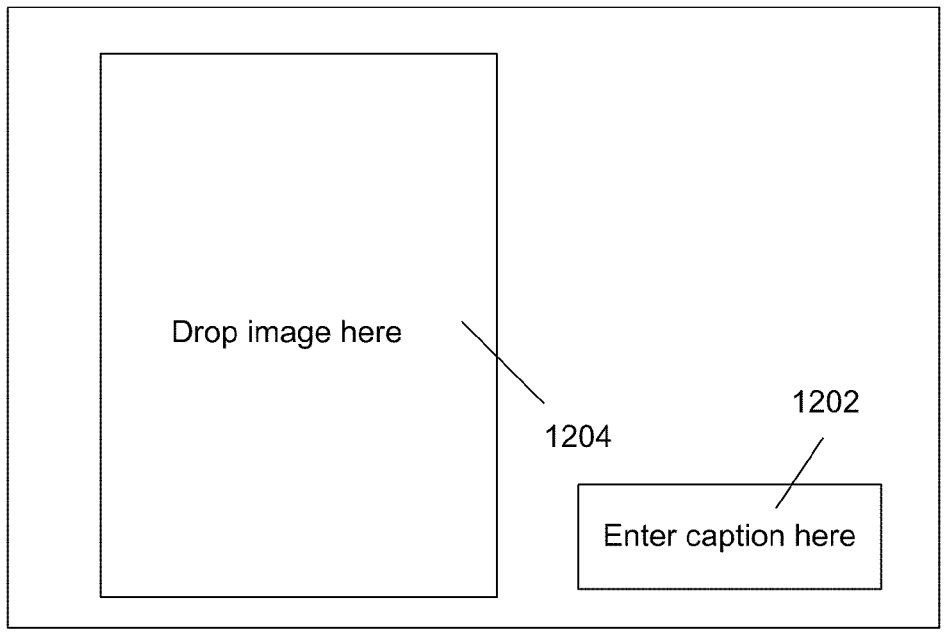

FIGS. 12A and 12B illustrate pages including image caption areas.

Figure 13A:
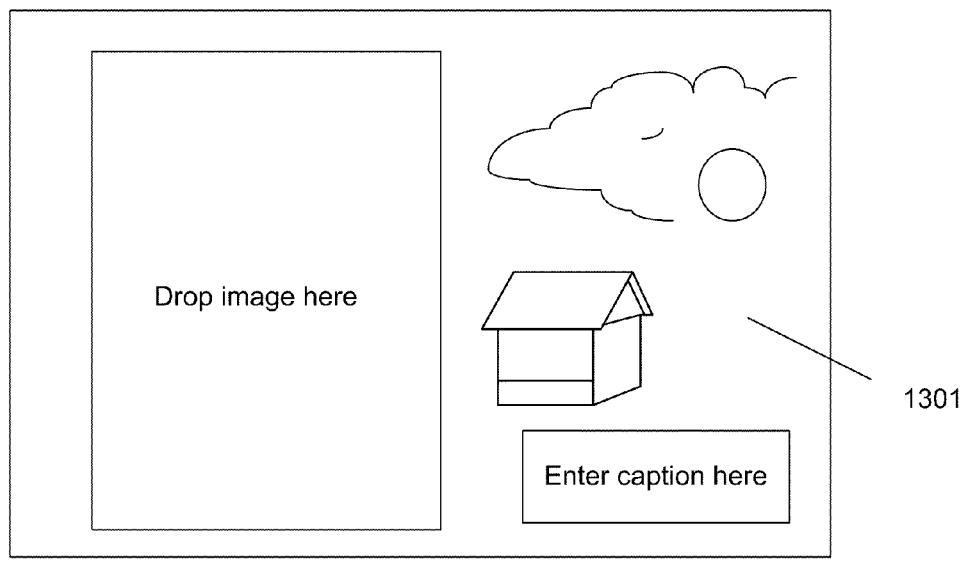
Figure 13B:
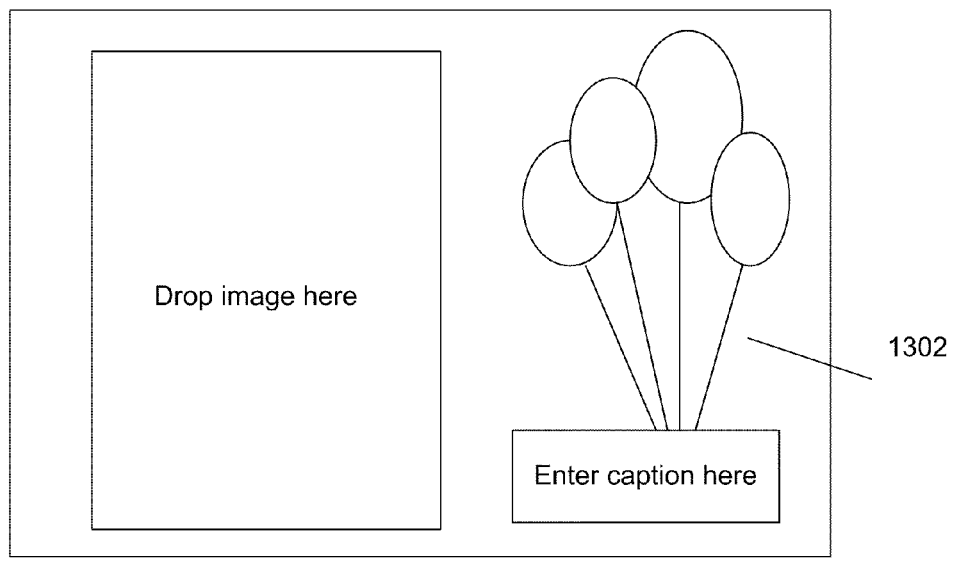

FIGS. 13A and 13B illustrate pages having different backgrounds.

DETAILED DESCRIPTION

In the present invention, the term "photo album" refers to a book that includes one or two cover pages and one or more image pages. Each of the image pages can include one or more images. The image pages can also include text or image caption. The image layout can also include a background pattern. In the imaging industry, photo albums can include photo books, scrapbooks, snap books, and any books form including bound image pages.

Figure 1:
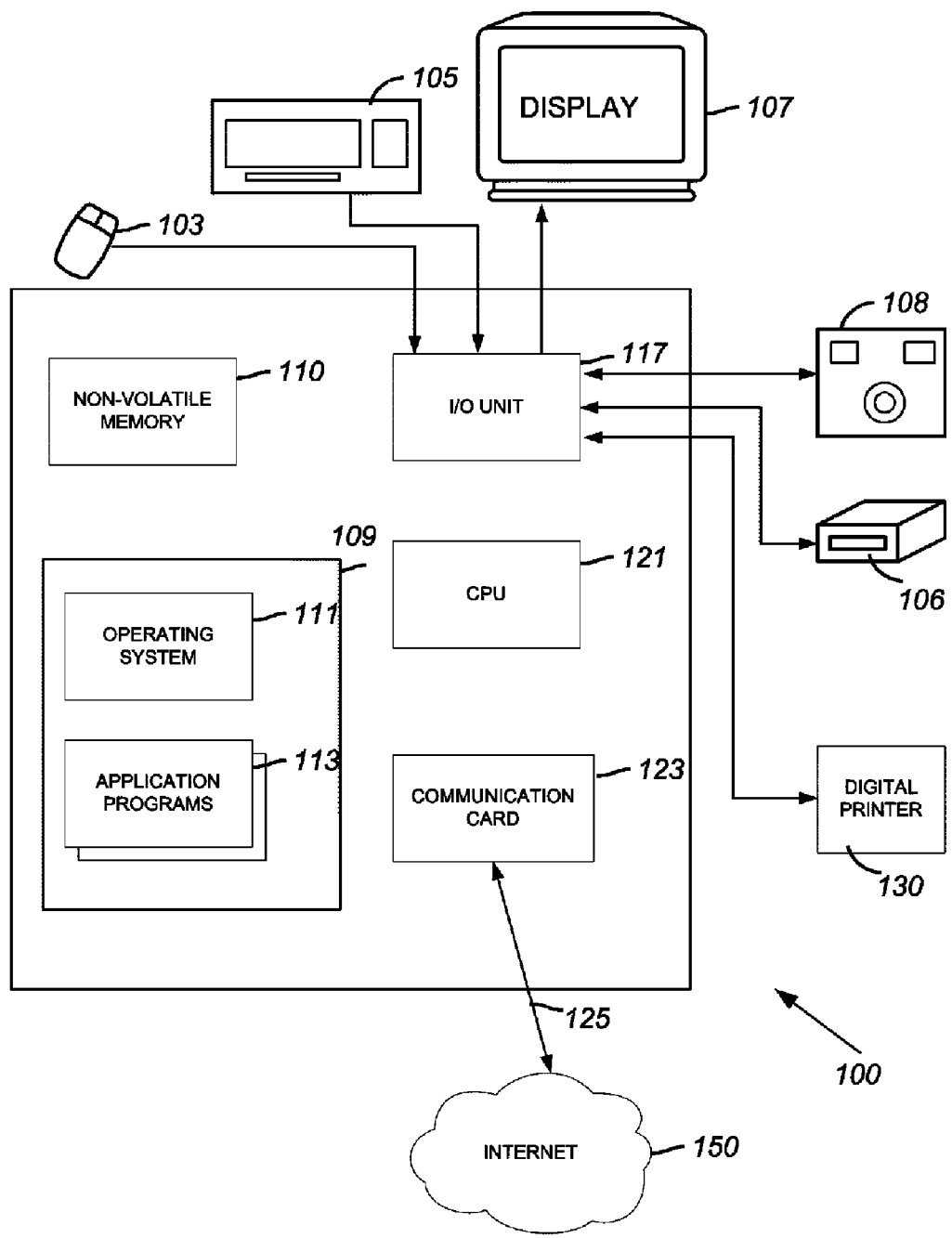

A computer system 100 illustrated in FIG. 1 represents an exemplified hardware setup for executing software that allows a user to perform tasks such as communicating with other computer users, accessing various computer resources, and viewing, creating, or otherwise manipulating electronic content, that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 such as a cable modem, DSL service or wireless Internet connection.

The computer 100 of FIG. 1 also can be connected to various peripheral I/O devices. One of the more popular of such peripheral devices is a digital camera 108. The digital camera 108 enables users to take pictures (i.e., images), which are saved in memory (not shown) within the digital camera 108 in a digital (electronic) format. After taking and storing the images, the user can connect the digital camera 108 to a computer system 100 in order to upload the digital images to the computer's disk drive or other non-volatile memory 110. The user can also wirelessly transfer digital images in the digital camera to the computer system 100. Once the digital images are uploaded to the computer system 100, the user can erase the digital images from the memory of the digital camera 108 so that the user can take and store additional images using the digital camera 108. Typically, the digital camera 108 is connected to the computer 100 only while the user is uploading images to the computer's disk drive or other non-volatile memory 110.

Users also can obtain digital images, for example, of film-based prints from a traditional camera, by sending an exposed film into a photo-finishing service, which develops the film to make prints and then scans (or otherwise digitizes) the prints or negatives to generate digital image files. The digital image files then can be transmitted back to the user by e-mail or on a CD-ROM, diskette, or other removable storage medium.

Once the digital images are stored on the computer 100, a user can perform various operations on them. For example, an image viewer application can be used to view the images. A photo editing application can also be used to touch-up or otherwise modify the images. In addition, an electronic messaging (e.g., e-mail) application can be used to transmit the digital images to other users.

Figure 2A:
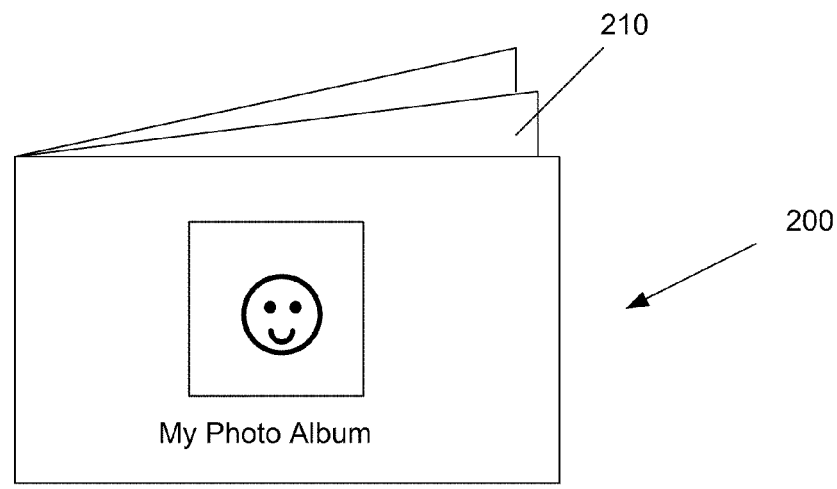
Figure 2B:
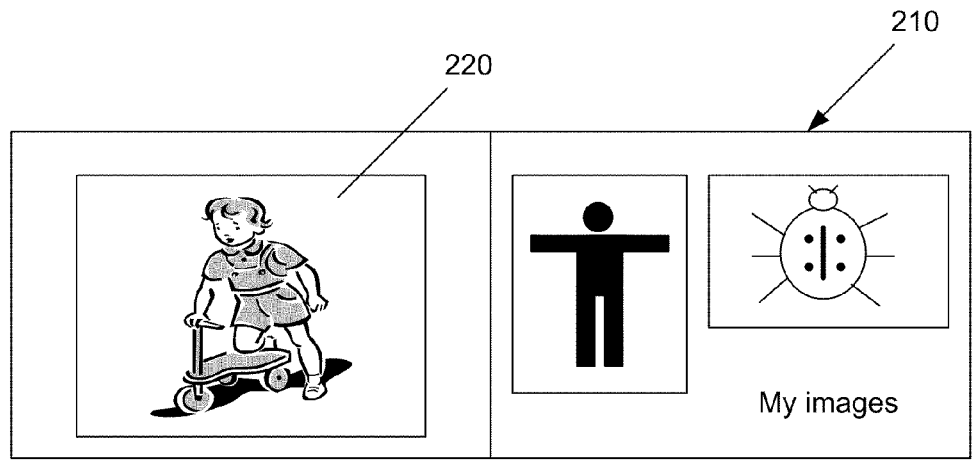

In addition to viewing the digital images on the computer display 107, users often desire to have physical products based on the digital images. Such hard copies can be generated locally by the user using output devices such an inkjet printer or a dye sublimation printer 130 or remotely for a photo printing service provider. Other products based on the digital images can include photo books, photo calendars, photo mug, photo T-shirt, and so on. A photo book can include a cover page and a plurality of image pages each containing one or more images. Each page can also include different formats. Designing a photo album can include many iterative steps such as selecting suitable images, selecting layout, selecting images for each page, add text, which can be quite time consuming. It is desirable to provide methods for designing and producing photo albums that can substantially save a user's time. FIGS. 2A and 2B shows an exemplified photo album 200 comprising a plurality of many pages 210, each including one or more images 220 provided by a user. The user can select a layout for each page and select images 220 for each page.

Figure 3A:
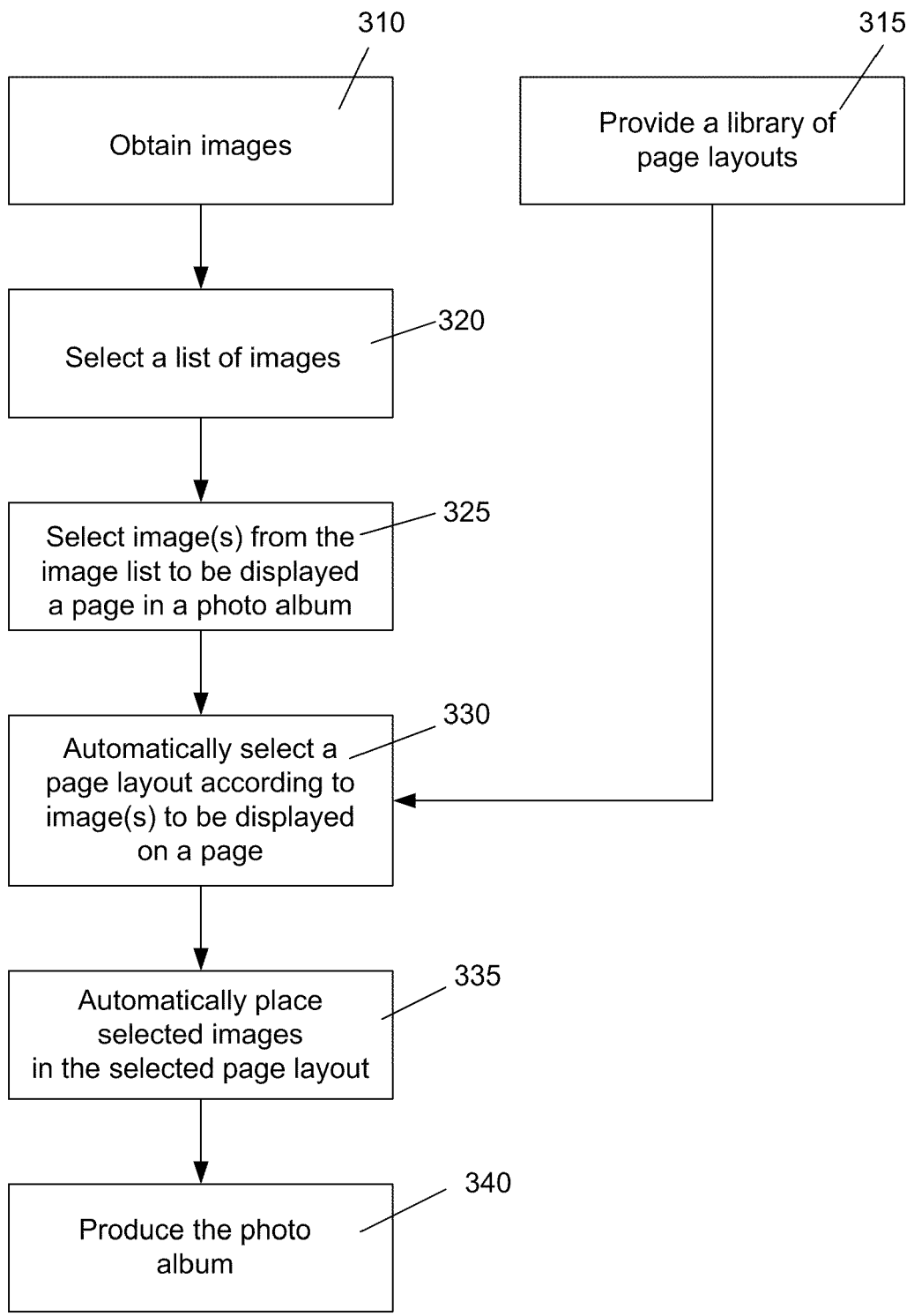
FIG. 3A shows an exemplified flow chart for creating a photo album.
Figure 4:
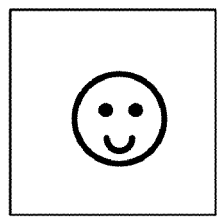
FIG. 4 illustrates a collection of images to be selected.
Figure 4:
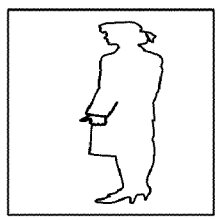
Figure 4:
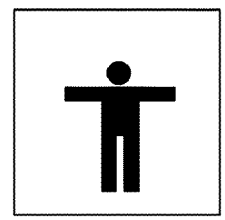
Figure 4:
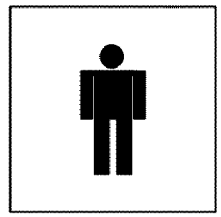
Figure 4:
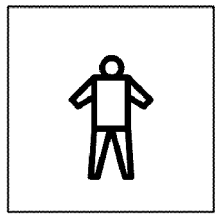
Figure 4:
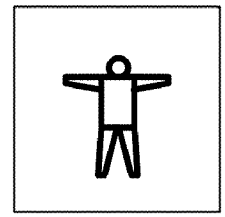
Figure 4:
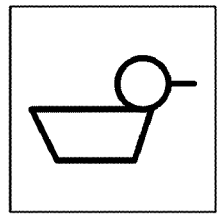
Figure 4:
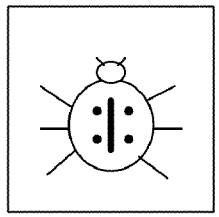
Figure 4:
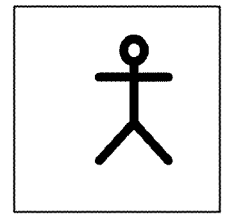
Figure 4:
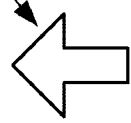
Figure 4:
Figure 4:
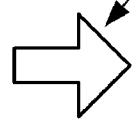

Referring to FIG. 3A, a photo album can be created in the following steps: images can be captured by taking pictures using a digital camera, copying existing images through the Internet, or by any other methods. The captured images are then transferred to a computer and stored in a memory on the computer (step 310). A user selects a list of images on the computer system 100 to be used in a photo album (step 320). Referring to FIG. 4, a collection 400 of images is shown in a graphic user interface as candidates to be incorporated into a photo album. By clicking on the small square below each of the images, the images can be selected into an image list 500 (shown in FIG. 5). More images can be viewed and selected into the image list by clicking a "next page" button 410 or a "previous page" button 420.

Figure 5:
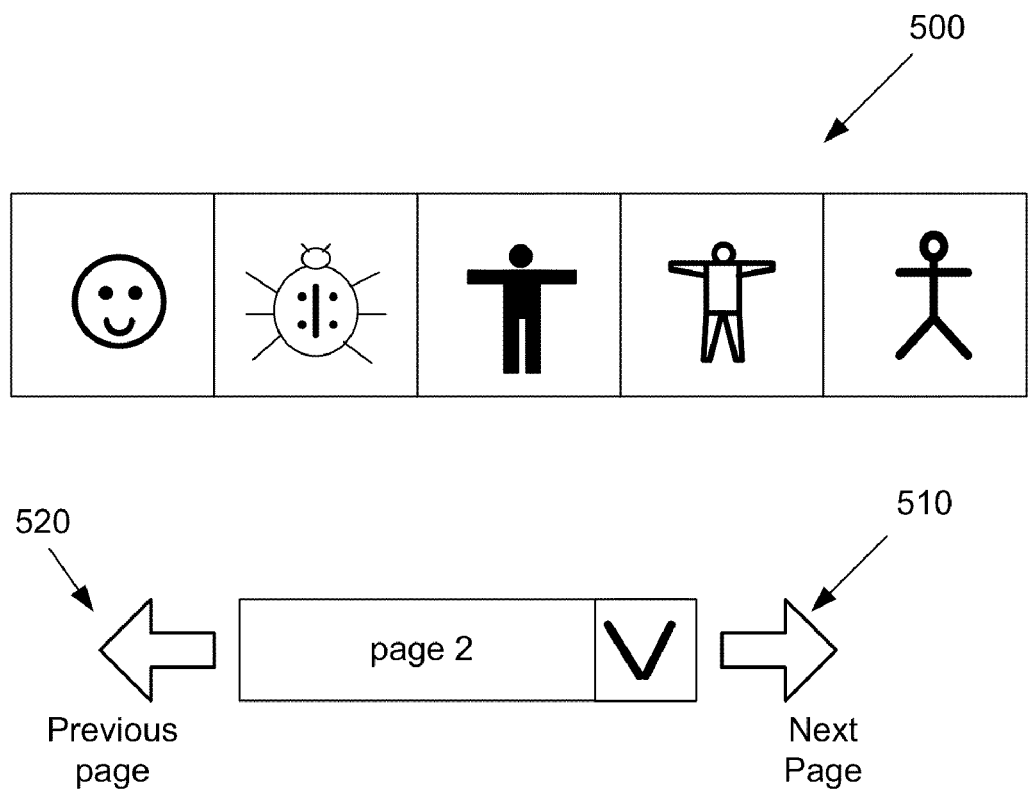
FIG. 5 illustrates an image list selected from the collection of images in FIG. 4.

Referring to FIG. 5, an image list 500 can therefore created by the user. The user interface in FIG. 5 shows an array of thumbnail images that represent the original images (i.e. full size images) provided by the user. The image list 500 can reside on different view fields which can be viewed by clicking the "next page" button 510 or the "previous page" button 520. In some embodiments, the image list 500 can be sequenced in a same order as how they will be incorporated into a photo album. The sequence of images in the image list 500 can chronically ordered by capture time. Alternatively, the images can also be grouped and ordered by events and activities, which may be optimal for telling a story using the photo album.

Referring back to FIG. 3A, a user can select the images to be displayed on a page of the photo album in a number of different ways. For example, referring to FIG. 7A, a user can select, by clicking a button on a user interface, how many images are to be displayed on the next page of a photo album. For example, there can be one, two, and three images on a page. The number of images per page can vary in a photo album. In some cases, a user may select a constant number of images for each page of a photo album.

In another example, the image list 500 (FIG. 5) can be separated by page groups. As shown in FIG. 7B, images 731-735 that represent the original images in the image list 500 can be graphically grouped in two page groups: Page 10 and Page 11 in a graphic user interface 700. The images 731, 732 in Page 10 can be surrounded by a border 740 to clearly separate them from the images 733-735 that are positioned within a border 741. Each page can include different numbers of images, and different types (portrait, landscape, round, oval, diamond, square, etc.) images. A landscape format describes images that have longer lateral dimensions than their vertical dimensions. A portrait format refers to images that have longer vertical dimensions than lateral dimensions. A user can flexibly move images 731-735 between different page groups. Buttons 710 and 720 can help a user to browse all the pages in the photo album.

A user can readily re-arrange images between different pages using the user interface shown in FIG. 7B. For example, a user can move image 732 from page 10 (within border 740) to page 11 (within border 741). The user can also move image 733 from page 11 (within border 741) to page 10 (within border 740). The user can easily add or remove images from the borders 740 or 741 and the pages they respectively represent by moving images from or to the image list. The number of images within each border and their associated pages can thus be easily adjusted by the user. The page layouts, as described below, can be automatically selected in response to the dynamic changes in the image compositions in the borders 740 and 741.

Referring back to FIG. 3A, a library of page layouts are provided for creating pages in a photo album (step 315). A page layout defines one or more image areas on a page in the photo album. An image area can have a rectangle shapes such as landscape or portrait format, or square. An image area can also have round, shape, diamond, or other shapes. A page layout can have different numbers of images which may have different combinations of landscape and portrait formats for the image areas.

Figure 6A:
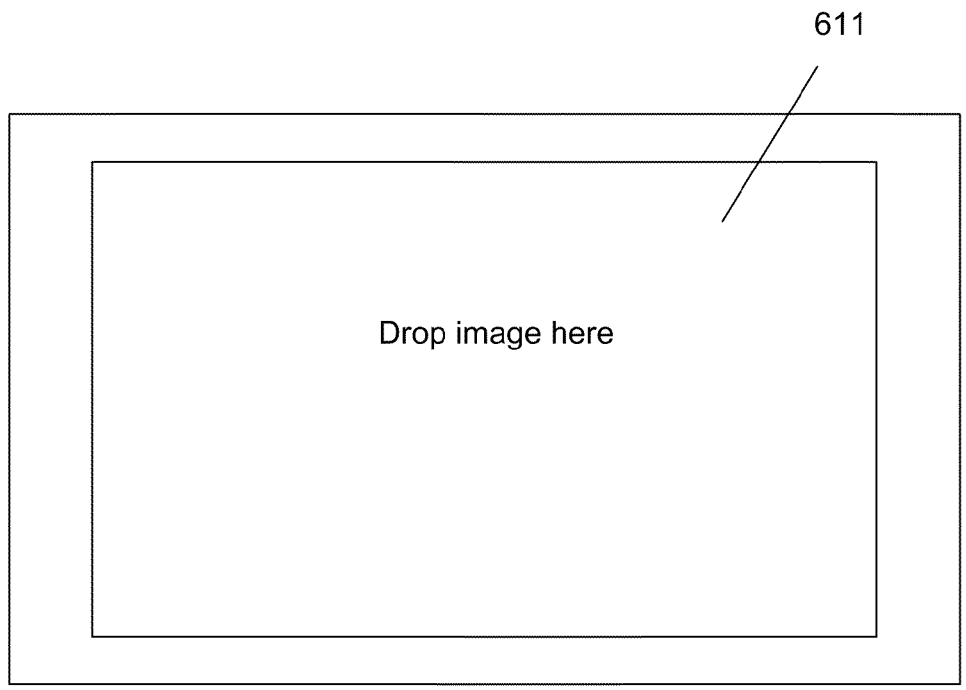
Figure 6B:
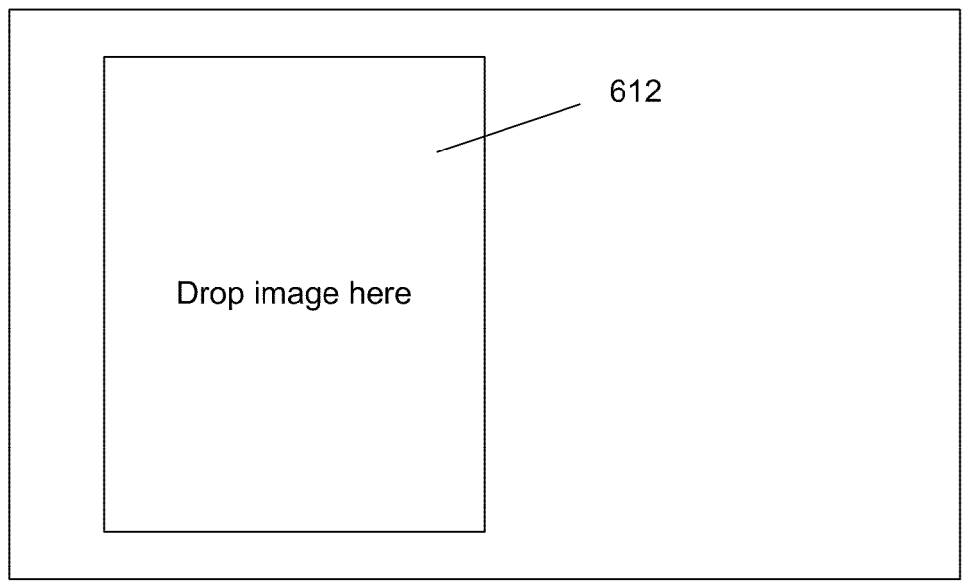
Figure 6C:
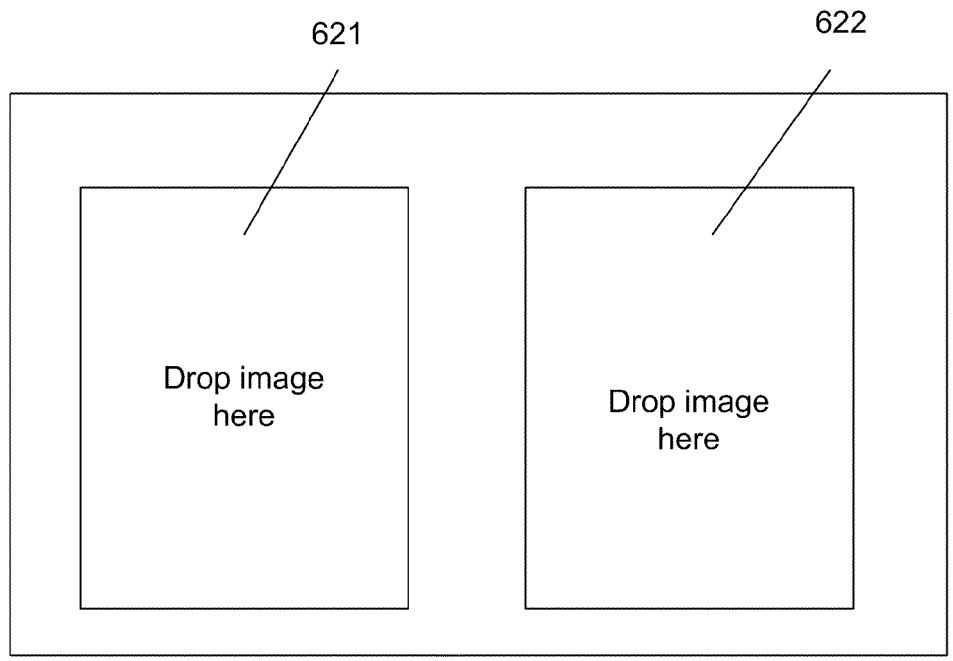
Figure 6D:
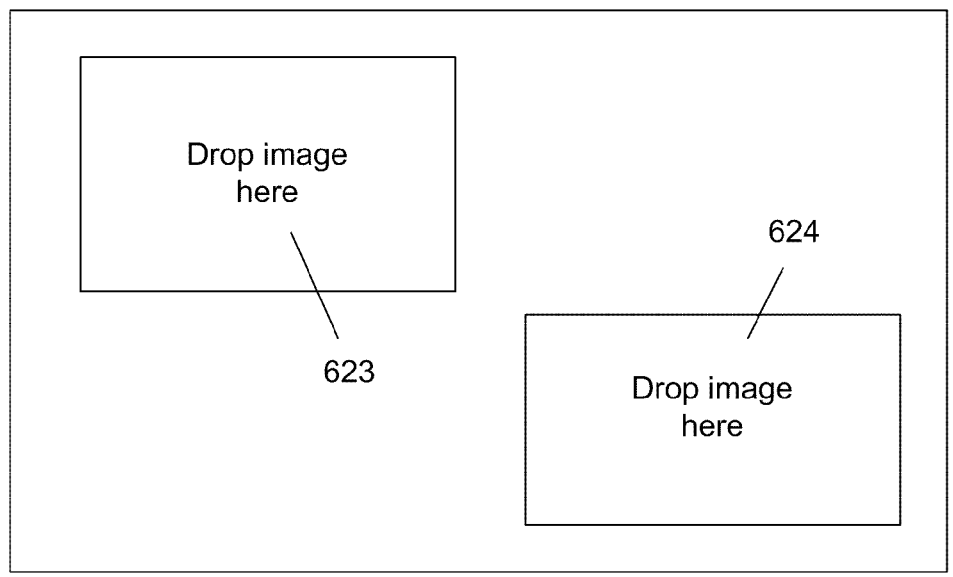
Figure 6E:
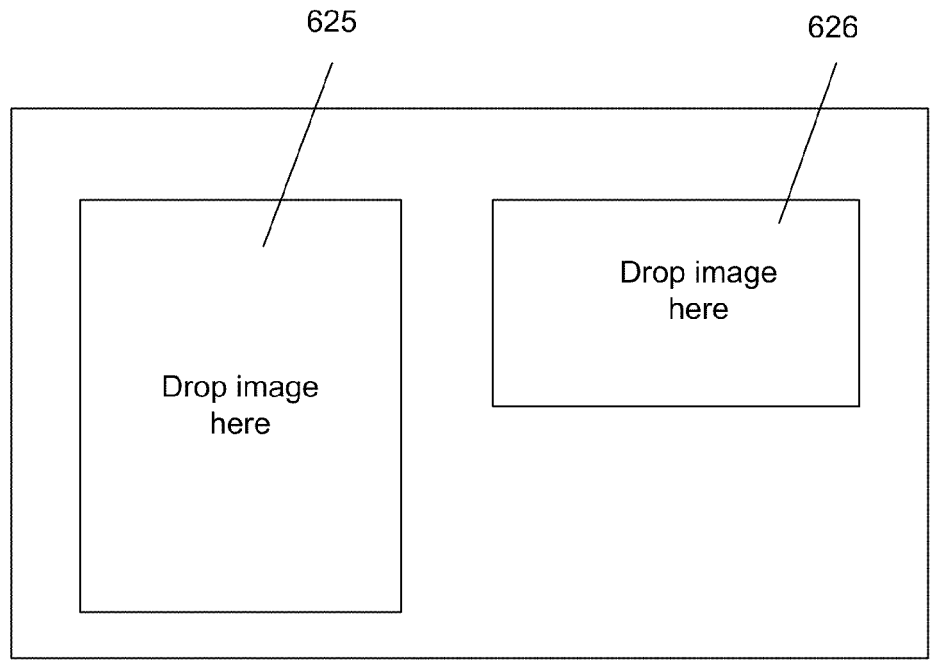
Figure 6F:
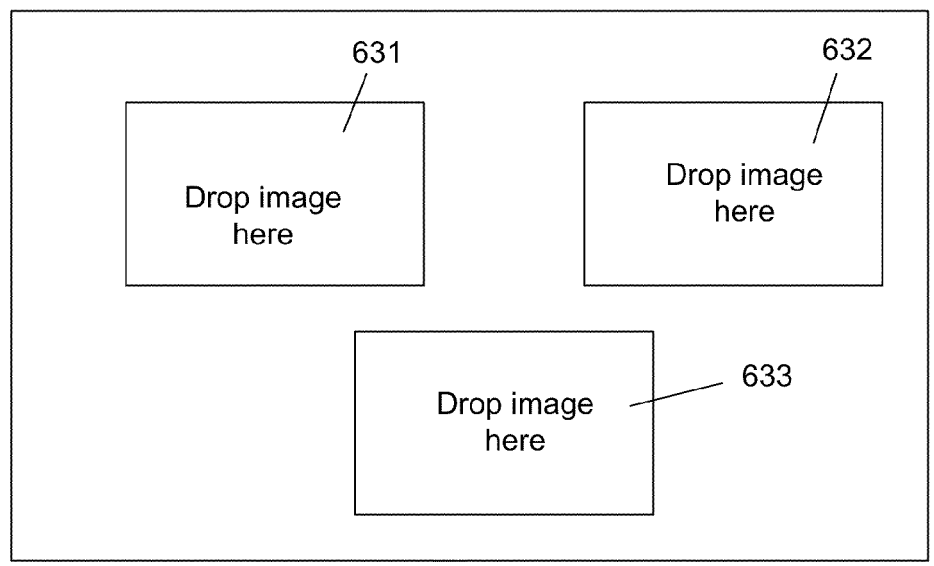
Figure 6G:
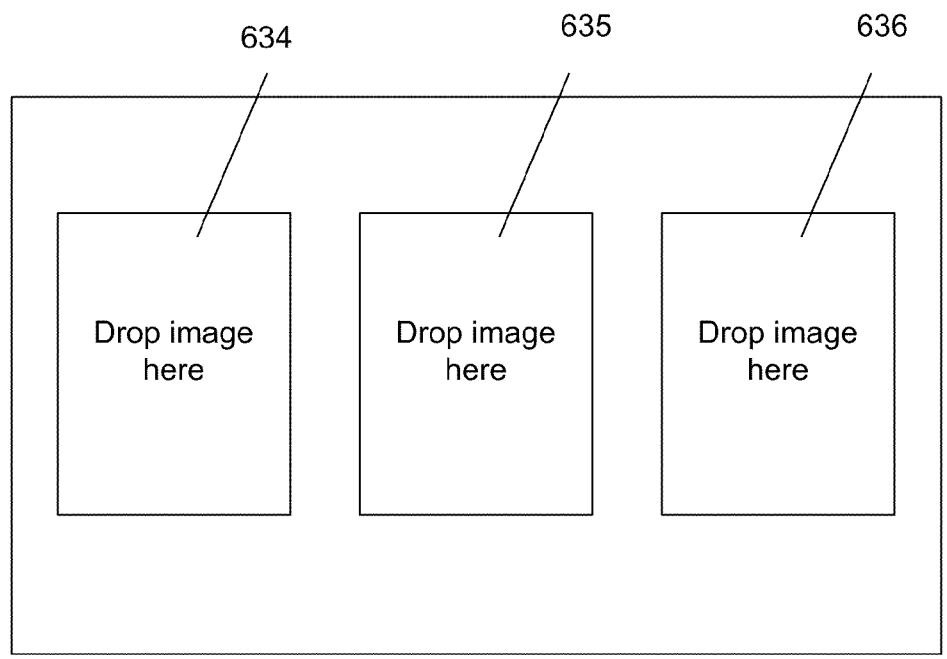
Figure 6H:
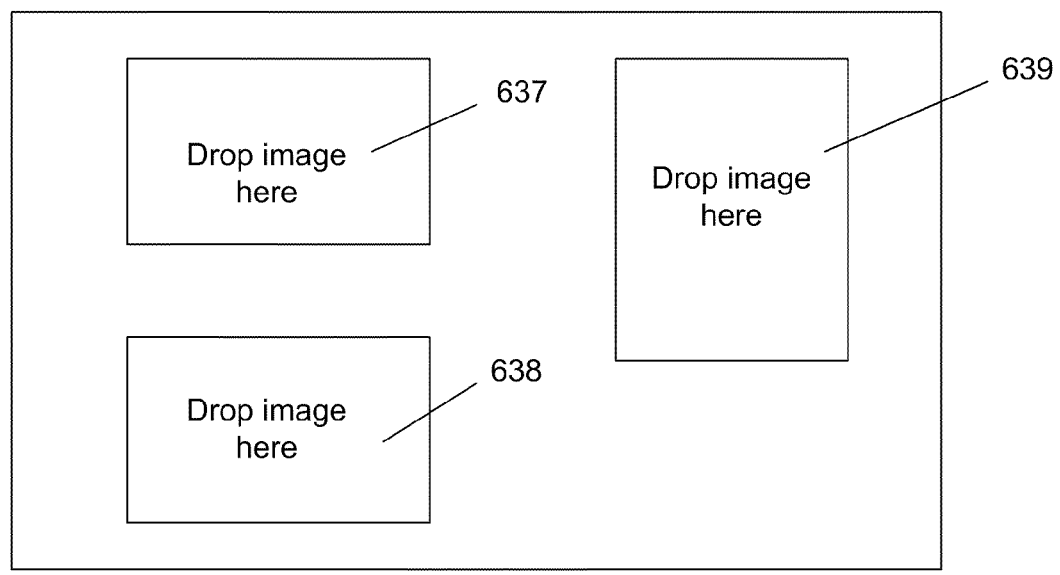
Figure 6I:
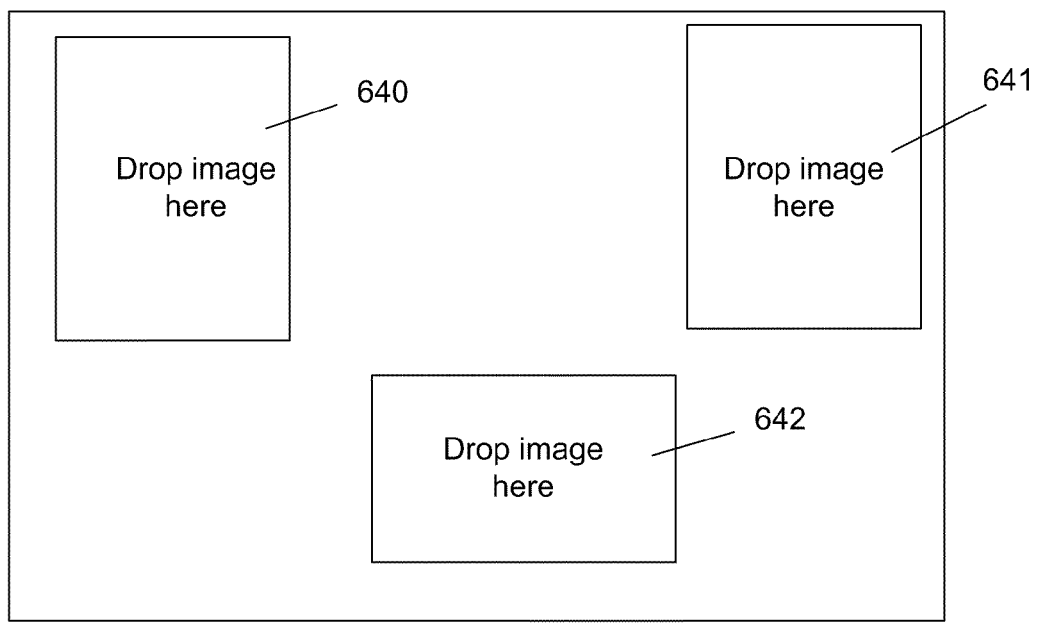

FIGS. 6(a) to 6(i) illustrate exemplified page layouts for a photo album. The page layout shown in FIG. 6(a) contains a single image area 611 for receiving an image in landscape format. FIG. 6(b) shows a pay layout containing an image area 612 suitable for a portrait image. A page layout in FIG. 6(c) includes portrait image areas 621 and 622, while the page layout in FIG. 6(d) contains landscape areas 623 and 624. FIG. 6(e) shows a layout that includes a portrait image area 625 and a landscape area 626. FIG. 6(f) shows a pay layout having three landscape areas 631, 632, and 633, while FIG. 6(g) shows three portrait areas 634, 635 and 636 in a page layout. FIG. 6(h) shows two landscape areas 637, 638 and a portrait area 639 in a page layout. FIG. 6(i) shows two portrait areas 641, 642 and a landscape area 643 in a page layout.

In accordance with the present invention, the disclosed system and methods can automatically select a page layout from the library of page layouts in accordance to the properties of the images to be displayed on a page (step 330). For each page in the photo album, the page layout selected from the library of page layouts should include the same number of images to be displayed on the next page. The page layout selected should also include the same numbers of portrait and landscape image areas as the numbers of portrait and landscape images to be displayed on the next page.

Since it is desirable to provide a large number of page layouts, multiple page layouts in the page layout library may satisfy the number and format of the groups of images to be displayed on the next page. For example, five page layouts may exist that all include two image receiving areas with one portrait and one landscape format, as required by the group in Page 10 (shown in FIG. 7B). An algorithm stored in the computer or at a remote server can automatically select one of the multiple choices from the satisfactory page layouts. For example, the most popular page layout among five satisfied page layouts can be selected. The user can change the page layout later when the user fine tunes the designs of the photo album.

Once an appropriate page layout is selected for the images to be displayed on the next page, referring back to FIG. 3A, the selected images can be automatically placed onto the selected page layouts to create pages (step 335). Image cropping may be needed in some situations when the aspect ratio or shape of an image receiving area in a page layout does not exact fit a selected image. The image cropping can be automatically conducted by a computer or determined by a user.

An electronic file containing the designs for the photo album can be produced and stored on the computer 100 (step 340). A physical (i.e. hardcopy) photo album (or photobook)

can be manufactured by a digital printer and other finishing equipment in accordance to the designs defined by the electronic file.

Other detailed examples about the selections of images for a page and the subsequent automatic selection of page layout (steps 325 and 330) are illustrated in FIGS. 8-11. In FIG. 8, a single picture is selected for a page. The image list and the library of page layouts are provided (steps 801 and 802). The disclosed system can automatically select from the top of the image list 500 (step 803). The selected image is removed from the image list 500 (step 804). The format of the selected image is next checked (step 805) if it is of a landscape or a portrait format, or other shapes such as round, oval, diamond, etc. If the selected image has a landscape format, the image is dropped in the image area 611 of the page in FIG. 6(a) in step 806. If the selected image is portrait, the disclosed system drops the image in the image area 612 of the page in FIG. 6(2) in step 807. In step 808, the disclosed system adds the page that has just been processed in either step 806 or step 807 to the photo album 200 that is being created. In step 809, the disclosed system checks if the image list 500 is empty. If the image list 500 is empty, it means all images in the list have been added to the photo album 200. The disclosed system then saves the complete photo album 200 on the computer. The photo album can be produced by a digital photo printer and other equipment (step 810). If the image list 500 is not empty, there are unused images on the list to be added to the photo album 200. In this case, the disclosed system goes back to step 803 to select the next available image at the top of the image list 500. This loop is continued until all images in the image list 500 are used and added to the photo album 200.

In FIG. 9, two images are selected to be displayed on a page of the photo album. The disclosed system selects up two images from the image list 500 to dispose in the image areas (step 903). The selected images are removed from the image list 500. In step 905, the disclosed system checks if the two selected images are both landscape images. If they both are, the disclosed system randomly drops the two images into image areas 623 and 624 in FIG. 6(d). If the check in step 905 is "No", the disclosed system checks in step 906 if both selected images are portrait images. If they both are portrait images, the disclosed system randomly drops the two images into the image areas of 621 and 622 in FIG. 6(c). If the check in step 906 is "No", the only possibility is, one of the selected images is landscape image and the other is portrait image. In this case, the disclosed system drops the portrait image in the image area 625 and the landscape image in the image area 626 in FIG. 6(e) in step 909. When either steps 907, 908 or 909 is finished, the disclosed system, in step 910, adds the page created in either steps 907, 908 or 909 to the photo album 200 that is being created. Then in step 911, the disclosed system checks if the image list 500 is empty. If the image list 500 is empty, it means all images in the list have been added to the photo album 200. The disclosed system then sends the complete photo album 200 to a digital photo printer to print out the photo album in step 912. If the image list 500 is not empty, there are unused images on the list to be added to the photo album 200. In this case, the disclosed system goes back to step 903 to select the next two available images at the top of the image list 500. This loop is continued until all images in the image list 500 are used and added to the photo album 200.

When the computer system picks up the next two available images from the image list 500. Toward the end of the image list 500, there can be either one image left in the image list 500, or there can be two. If two images remain in the image list 500, the disclosed system picks up the last two images finishes the photo album (step 912). If the image list 500 only includes a single remaining image, the disclosed system picks up the last image and treats the second empty image as having the same format as the last available image. The final finished photo album 200 can have an empty image area on the last page. The disclosed system can also automatically adjust the last page to include only one image receiving area.

In FIG. 10, three images are selected to be displayed on a page of the photo album. An image list 500 and a page layout library are first taken by the disclosed system (not shown in FIG. 10). In step 1003, the disclosed system selects up three images from the image list 500. The selected images are then removed from the image list 500. In step 1005 the disclosed system checks if all three selected images are of landscape format. If the check 1005 is "Yes", the disclosed system randomly drops the three selected images into 631, 632 and 633 of FIG. 6(f). If the check 1005 results in "No", the disclosed system checks, in step 1006, if all three selected images are of portrait format. If the check 1006 results in "Yes", the disclosed system, in step 1009, randomly drops the three selected images into 634, 635 and 636 in FIG. 6(g). If the check 1006 is "No", the disclosed system, in step 1007, checks if two of the three selected images are of landscape format and the third selected image is of portrait format. If the check 1007 results in "Yes", the disclosed system, in step 1010, drops randomly the two landscape images into 637 and 638 and the one portrait image in 639 in FIG. 6(h). If the check 1007 results in "No", the only possible combination is that two of the selected images are portrait images and the third one landscape. The disclosed system, in step 1011, randomly drops the two portrait images into 640, and 641, and the landscape image in 642 of FIG. 6(I). With either of the steps 1008-1011 is finished, the disclosed system adds the current page to the photo album 200 in step 1014 followed by a check 1012 to see if the image list 500 is empty. If the check 1012 is "Yes", all images in the image list 500 have been added to the photo album 200, and the disclosed system sends the photo album to a digital printer in step 1013. If the check 1012 results in "No", there are unused images in the image list 500, and the disclosed system goes back to step 1003. This loop is on until all images in the image list 500 are used in the photo album 200.

As the image list may emptied out as pages in the photo album is filled. There may be 1, 2 or 3 remaining images in the image list 500. In the case there are three remaining images in the image list 500, the disclosed system goes through the ordinary process and selects the last three images. In the case that there is one remaining image in the image list 500, there are two possibilities. If the remaining image is landscape, the disclosed system produces the last page of the photo album 200 using the page layout of FIG. 6(f), with 631 filled with the last image in the image list 500, and 632 and 633 empty. If the remaining image is portrait, the disclosed system produces the last page of the photo album 200 using the page layout of FIG. 6(g), with 634 filled with the last image in the image list 500, and 635 and 636 empty. In the case there are remaining images in the image list 500, there are three different situations. (1) Both of the remaining images are landscape images. (2) Both of the remaining images are portrait images. (3) One of the remaining images is landscape image and the other portrait. For situation (1), the disclosed system uses the page layout of FIG. 6(f), filling 631 and 632 with the two remaining images, and leaving 633 empty. For situation (2), the disclosed system uses the page layout of FIG. 6(g), filling 634 and 635 with the two remaining images, and leaving 636 empty. For situation (3), the disclosed system used the page layout of FIG. 6(h), filling 637 with the remaining landscape image and 639 with the remaining portrait image and leaving 638 empty. For the cases where there are one or two empty image areas in the last page of the photo album 200, the user can either leave the finished photo album 200 as it is, or manually fill the open image area(s) with additional image(s).

A user can also select different numbers of images for a page in the photo album, such as a combination of one, two, or three images per page, as shown in FIG. 11. In step 1103, the disclosed system randomly selects a number among 1, 2 or 3 for number of images on the current page of the photo album 200 that is being created. After the number of images is selected, the disclosed system selects that number of images from the image list 500. The selected images are then removed from the image list 500. The disclosed system then checks if a single image has been selected (step 1105). If the result is "Yes", the selected image is dropped in the current page (step 1107) (which can include steps 805, 806, and 807 as shown in FIG. 8). If the result is "No" in step 1105, the disclosed system further checks if two images have been selected (step 1106). If the check 1106 results in a "Yes", the disclosed system drops the two selected images in the current page in step 1108, which includes steps 905-909 in FIG. 9. If the check 1106 results in a "No", three images must have been picked. In this situation, the disclosed system drops the three selected images to the current page in step 1109, which includes steps 1006, 1007, 1009-1011 in FIG. 10. After either of steps 1107, 1108, or 1109 is finished, the disclosed system adds the current page to the photo album 200 in step 1110. Then the disclosed system checks in step 1111 if the image list 500 is empty. If the image list 500 is empty, all images have been added to the photo album 200. The disclosed system sends the photo album 200 to a digital printer in step 1112 to print out a hard copy of the photo album. If the image list 500 is not empty, there are unused images remaining to be added to the photo album 200. The computer goes to step 1103 and select more images to process. The loop can continue until all images in the image list are incorporated into the photo album 200.

The page layouts can include text field for receiving text from user. The text can be image caption associated with each image on the page. The text can also be a general caption on the page. The text can include a title for the front or cover page of the photo album. As shown FIGS. 12A and 12B, captions area 1201 and 1202 is provided in page layouts next to their respective image receiving areas 1203 and 1204. A page layout can also be featured with some pre-defined background images. For example, FIG. 13A has a background 1301 with a house, some cloud and a sun in the ski, while FIG. 13B has a background 1302 with some balloons. The user can change the background for each and every page of the photo album 200. The background images can also be automatically selected by the computer in response to the image content, the title of the photo album or the captions for the images entered by the user.

Figure 3B:
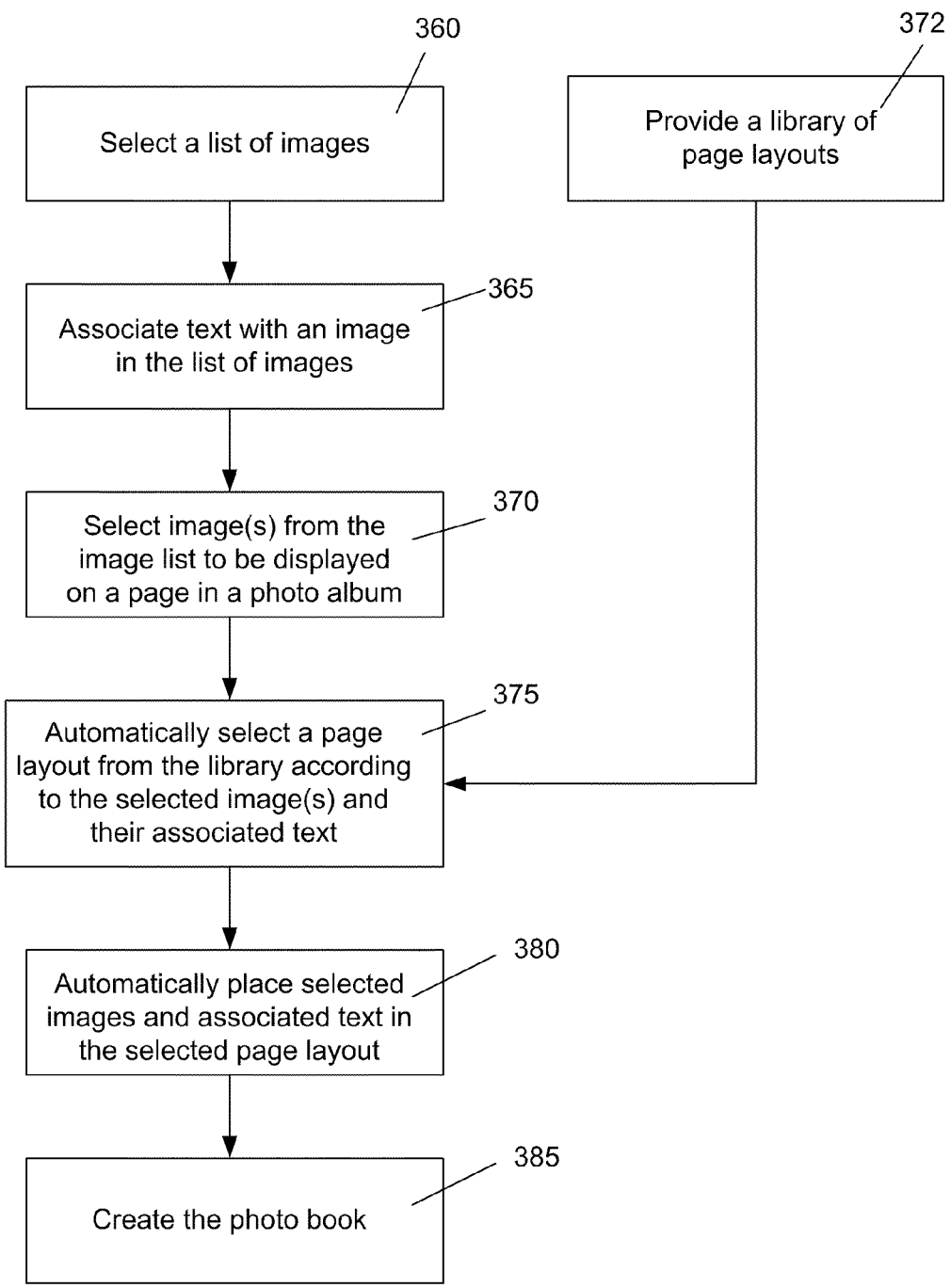
FIG. 3B shows another exemplified flow chart for creating a photo album.

In some embodiments, referring to FIG. 3B, after a list of images is selected (step 360), text information can be entered by the user in association with an images in the image list (step 365). The text information can include description or remarks about an image. The text associated with an image is stored as an integrated data structure in a computer memory. When an image is selected from the image list (step 370), the text information associated with the selected image is automatically captured together with the selected image. A library of page layouts are separately proved (step 372). Next, a page layout is automatically selected from the library of page layouts in accordance with the properties of the images on the page as well as the test information associated with the image receiving areas in the page layout (step 375). The format of the image receiving field in the page layout matches the format of the selected image. The page layout also includes an image caption area positioned adjacent to the image receiving area for receiving the associated text information. For example, one portrait image and one landscape image may be selected for the next page. The portrait image has associated text information entered by the user and stored in conjunction with the portrait image. The landscape is not associated with any text information. In selecting a page layout, the disclosed system first select page layouts containing two image receiving areas, and then further selects page layouts that have include one portrait and one landscape image receiving areas. Additionally, the disclosed system further selects page layouts that include an image caption area in association with the portrait image receiving area. After the page layout is selected, the selected image(s) and associated text are automatically placed in the selected page layout (step 380). The placement of the selected image(s) and associated text can be done in a single step because they are pre-stored in an integrated data structure as described previously. The same steps can be repeated for fill the image fields and text fields in each page of a photo book to create the photo book (step 385).

The disclosed systems and methods allow a user to conveniently create a photo album in minimum amount of time. Images can be flexibly organized according to page groups. Page layout can be automatically selected to match the images to be displayed on a page. Text information associated with the images can also be automatically incorporated into the pages of a photo album.

It should be understood that the library of page layout contains layouts with different numbers of images other than one, two, and three. For a given number of images page and for the given formats of the images, the layout is not limited to the designs shown in this invention. There can be a large variation of layout designs for the same number of images with the same formats on each page.

What is claimed is:

1. A method for producing a photo album having a first page and a second page, comprising:

providing, by a computer system, a library of page layouts each comprising one or more image receiving areas each associated with a format selected from the group consisting of portrait, landscape, round, oval, and diamond;

allowing a selection of a first group of one or more images to be placed in the first page of the photo album, wherein the first group of one or more images comprises a first image, wherein the first group of one or more images each has a format selected from the group consisting of portrait, landscape, round, oval, and diamond;

allowing a selection of a second group of one or more images to be placed in the second page of the photo album;

graphically displaying the first group of one or more images within a first border that represents the first page;

graphically displaying the second group of one or more images within a second border that represents the second page;

automatically selecting a first page layout from the library of page layouts, wherein the first page layout comprises one or more image receiving areas, wherein the number of image receiving areas in the first page layout matches the number of images in the first group; and automatically placing the first group of one or more images into the one or more image receiving areas in the first page layout to produce the first page in the photo album.

2. The method of claim 1, further comprising:
    allowing the first image within the first border to be moved, by a user, inside the second border; and
    automatically moving the first image from the first page layout to the second page layout.

3. The method of claim 1, wherein the step of automatically selecting a first page layout comprises:
    matching the formats of the one or more image receiving areas in the first page layout with the formats of the one or more images in the first group.

4. The method of claim 1, further comprising automatically displaying the first page having the first group of images placed in the one or more image receiving areas of the first page layout.

5. The method of claim 1, further comprising:
    allowing a plurality of images to be sequenced to form an image list, wherein the first group of one or more images is selected from the beginning of the image list.

6. The method of claim 1, wherein the first image is associated with text information, the method further comprising:
    after the step of automatically selecting a first page layout, automatically placing the text information in association with the image receiving area in the first page layout.

7. A method for producing a photo album having a first page and a second page, comprising:
    providing, by a computer system, a library of page layouts each comprising one or more image receiving areas each associated with a format selected from the group consisting of portrait, landscape, round, oval, and diamond;
    allowing a selection of a first group of one or more images to be placed in the first page of the photo album, wherein the first group of one or more images comprises a first image, wherein the first group of one or more images each has a format selected from the group consisting of portrait, landscape, round, oval, and diamond;
    allowing a selection of a second group of one or more images to be placed in the second page of the photo album;
    graphically displaying the first group of one or more images within a first border that represents the first page;
    graphically displaying the second group of one or more images within a second border that represents the second page;
    automatically selecting a first page layout from the library of page layouts, wherein the formats of the one or more image receiving areas in the first page layout are matched with the formats of the one or more images in the first group; and
    automatically placing the first group of one or more images into the one or more image receiving areas in the first page layout to produce the first page in the photo album.

8. The method of claim 7, further comprising moving an image within the first border into the second border to move the associated image from the first page to the second page.

9. The method of claim 7, wherein the step of automatically selecting a first page layout comprises:
    matching the number of image receiving areas in the first page layout with the number of images in the first group.

10. The method of claim 7, further comprising automatically displaying the first page having the first group of images placed in the one or more image receiving areas of the first page layout.

11. The method of claim 7, further comprising:
    allowing a plurality of images to be sequenced to form an image list, wherein the first group of one or more images is selected from the beginning of the image list.

12. The method of claim 7, wherein the first image is associated with text information, the method further comprising:
    after the step of automatically selecting a first page layout, automatically placing the text information in association with the image receiving area in the first page layout.

13. A method for producing a design of a photo album having a first page and a second page, comprising:
    allowing a selection of a first group of one or more images to be placed in the first page of the photo album, wherein the first group of one or more images each has a format selected from the group consisting of portrait, landscape, round, oval, and diamond;
    allowing a selection of a second group of one or more images to be placed in the second page of the photo album, wherein the second group of one or more images each has a format selected from the group consisting of portrait, landscape, round, oval, and diamond;
    graphically displaying, by a computer system, the first group of one or more images within a first border that represents the first page;
    graphically displaying the second group of one or more images within a second border that represents the second page; and
    automatically placing the first group of one or more images into a first page layout and the second group of one or more images into a second page layout to produce the design for the photo album.

14. The method of claim 13, further comprising:
    allowing a user to move a graphic representation of a first image from inside the first border to inside the second border; and
    automatically moving the first image from the first page layout to the second page layout.

15. The method of claim 13, further comprising:
    providing a library of page layouts by the computer system;
    automatically selecting the first page layout from the library of page layouts; and
    automatically placing the first group of one or more images into in the first page layout to form the first page in the photo album.

16. The method of claim 15, further comprising:
    matching the number of one or more image receiving areas in the first page layout to the number of images in the first group.

17. The method of claim 15, wherein the first page layout in the library of page layouts comprises one or more image receiving areas each associated with a format selected from the group consisting of portrait, landscape, round, oval, and diamond, the method further comprising:
    matching the formats of one or more image receiving areas in the first page layout to the formats of the one or more images in the first group.

18. The method of claim 13, wherein the first group of one or more images comprises a first image, wherein the first image is associated with text information, the method further comprising:
    after the step of automatically selecting a first page layout, automatically placing the text information into the first page layout in association with the first image.

* * * * *